(12) United States Patent
Ross

(10) Patent No.: US 9,058,925 B2
(45) Date of Patent: Jun. 16, 2015

(54) SOLENOID DONUT

(71) Applicant: Owen Venmore Ross, Venice, CA (US)

(72) Inventor: Owen Venmore Ross, Venice, CA (US)

( * ) Notice: Subject to any disclaimer, the term of this patent is extended or adjusted under 35 U.S.C. 154(b) by 0 days.

(21) Appl. No.: 13/626,903

(22) Filed: Sep. 26, 2012

(65) Prior Publication Data

US 2013/0082808 A1  Apr. 4, 2013

Related U.S. Application Data

(60) Provisional application No. 61/626,403, filed on Sep. 26, 2011.

(51) Int. Cl.
*H01F 7/08* (2006.01)
*H01F 7/16* (2006.01)
*H01F 41/00* (2006.01)
*H01F 5/00* (2006.01)

(52) U.S. Cl.
CPC ............. *H01F 7/1607* (2013.01); *H01F 41/00* (2013.01); *Y10T 29/4902* (2015.01); *H01F 5/00* (2013.01)

(58) Field of Classification Search
USPC ......................................................... 335/223
See application file for complete search history.

(56) References Cited

U.S. PATENT DOCUMENTS

| | | | | |
|---|---|---|---|---|
| 397,977 | A * | 2/1889 | Dressler | 178/63 R |
| 2,306,213 | A * | 12/1942 | Grave et al. | 335/222 |
| 3,045,152 | A * | 7/1962 | Davis | 335/222 |
| 3,135,879 | A * | 6/1964 | Baumann | 310/13 |
| 4,078,998 | A * | 3/1978 | Oder et al. | 209/223.1 |
| 4,859,940 | A * | 8/1989 | Hummert et al. | 324/204 |
| 5,243,128 | A * | 9/1993 | Marcoz | 174/47 |
| 5,442,285 | A * | 8/1995 | Zombo et al. | 324/227 |
| 5,534,775 | A * | 7/1996 | Lam et al. | 324/216 |
| 6,356,072 | B1 * | 3/2002 | Chass | 324/207.2 |
| 6,356,075 | B1 * | 3/2002 | Shank | 324/207.24 |
| 7,956,605 | B2 * | 6/2011 | Biester et al. | 324/207.24 |
| 2004/0263158 | A1 * | 12/2004 | Biester et al. | 324/207.24 |
| 2007/0095739 | A1 * | 5/2007 | Ebihara | 210/222 |

* cited by examiner

*Primary Examiner* — Shawki S Ismail
*Assistant Examiner* — Lisa Homza

(57) ABSTRACT

A donut-shaped solenoid surrounds a central plate which spins clockwise or counter-clockwise while holding an object, such as a tube, inside the solenoid coils so that the tube and its contents can be moved through the solenoid's magnetic field. Although the plate interrupts the solenoid coils, the plate is a conductor which can maintain the conductivity of the coils and thus the strength of the magnetic field. The solenoid donut can be of any size, but is especially intended to be at the approximate scale of a microchip, so as to fit inside any kind of hand-held or portable device, such as a cell phone, tablet or a laptop computer. Multiple solenoid donuts can be stacked in series to function within larger-scale devices such as air-conditioners, generators, or automobiles.

10 Claims, 2 Drawing Sheets

SOLENOID DONUT

CROSS-REFERENCES TO RELATED APPLICATIONS

This application claims priority from U.S. Application No. 61/626,403, filed Sep. 26, 2011 and which is incorporated by reference in its entirety.

BACKGROUND

The main object of the present invention is to create a solenoid shaped so that an object, such as a tube, can be held within the solenoid and moved continuously through its magnetic field without having to double-back on its path. One non-limiting purpose of the invention is to function in the context of a Proton Engine which converts matter into energy.

BRIEF SUMMARY OF THE INVENTION

When current flows through the coils of a solenoid, a magnetic field of proportional strength is generated through the center of the coils. Previous to the present disclosure, in order to pass an object through such a magnetic field, the object would need to be shaped to fit laterally across the coils, as would, for example, a second coil. Another solution would be to plunge the object in a piston-like manner through the center of the coils, that is, push it in and pull it out with a stabbing motion. But by forming a solenoid in the shape of a donut, the present disclosure enables an object—such as a circular tube filled with particles and wrapped in a conducting coil and an RF coil—to be held in place inside the donut-shaped solenoid and rotated clockwise or counter-clockwise at variable rates of speed uninterruptedly through the core of the coils and thus through its magnetic field.

DETAILED DESCRIPTION OF THE PREFERRED EMBODIMENTS

The following description is presented to enable any person skilled in the art to make and use the disclosed embodiments, and is provided in the context of a particular application and its requirements. Various modifications of the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
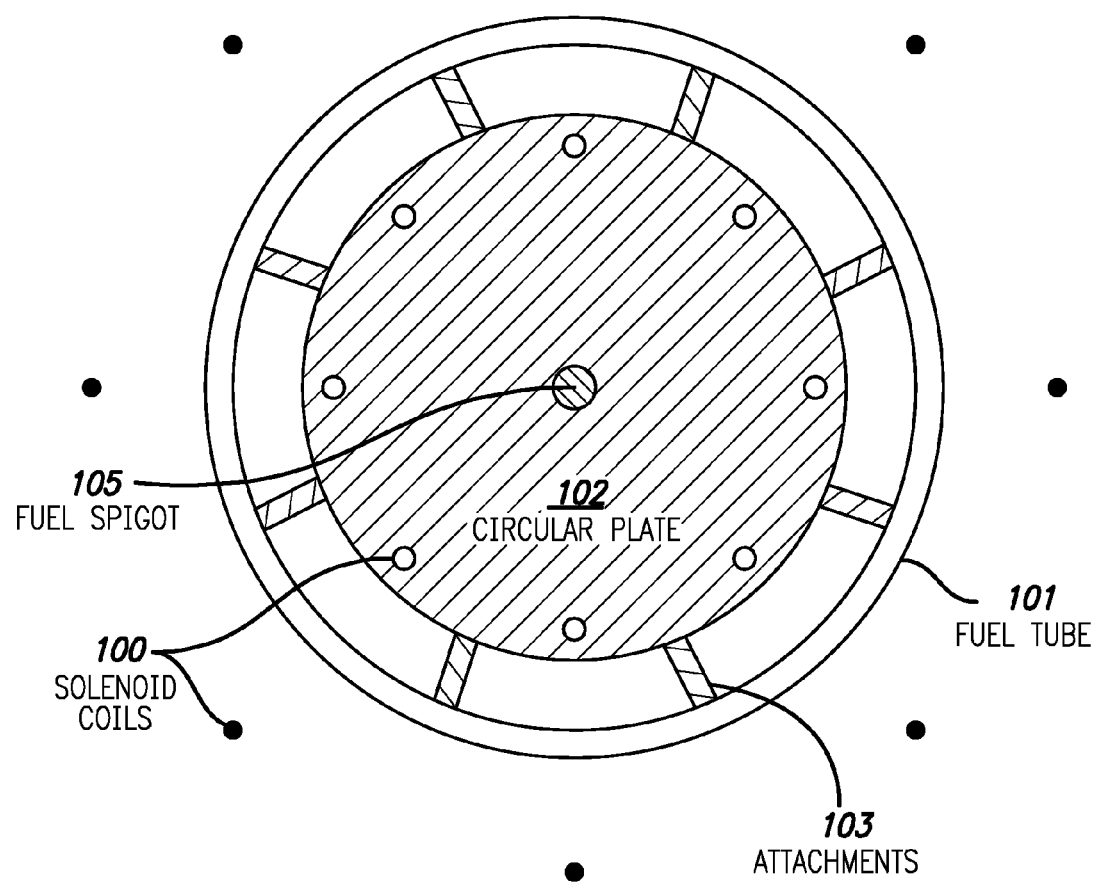
FIG. 1 illustrates a top view of the solenoid donut.

If a slinky toy were attached end-to-end, it would be in the shape of a donut, as are the coils of a solenoid 100 viewed in FIG. 1 from above. In order to move a tube 101 through the center of such a coil, a circular plate 102 can be placed inside the "donut hole," and built into the inner circumference of the coils so that the conductivity of the solenoid is uninterrupted.

The plate can then hold a tube around its circumference inside the center of the solenoid coils using attachments 103 and spin clockwise or counter-clockwise, while maintaining the electric current that creates the magnetic field, and while moving the tube uninterruptedly through the field.

Figure 2:
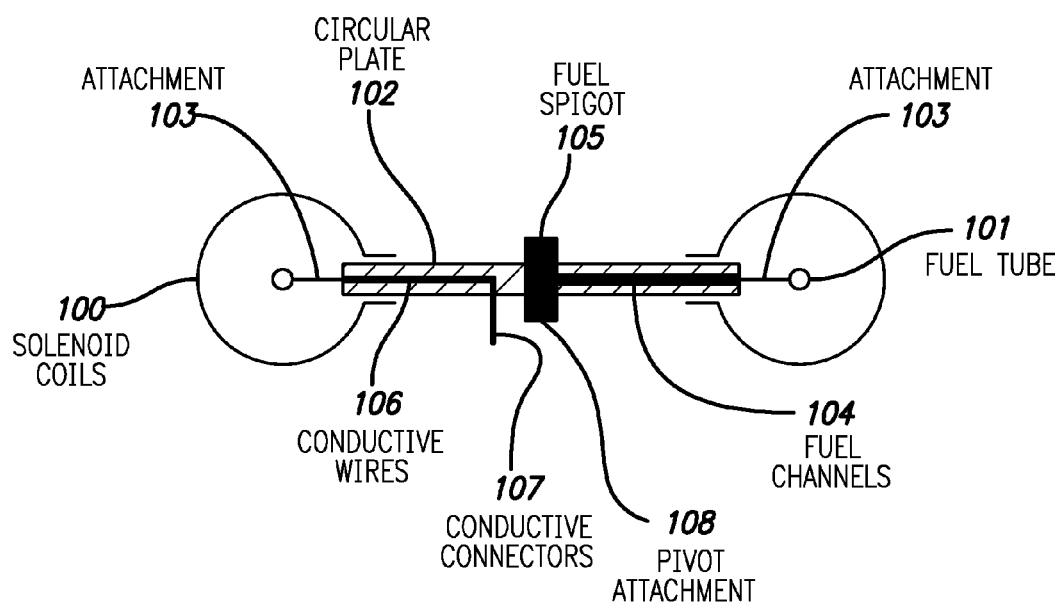
FIG. 2 illustrates a cross-sectional view of the solenoid donut.

FIG. 2 shows a cross-sectional view of the device. The juncture between the plate 102 and the inner circumference of the coils 100 can have a microscopic gap so that the plate can spin between them without creating any friction, yet still conduct electricity across the separation.

In other embodiments, the gap between the plate 102 and the coils 100 can be crossed by various strategies to promote conduction through the solenoid in order to create the magnetic field as needed. In one embodiment, the gap between the plate 102 and the coils 100 is lubricated with a conducting fluid that allows conduction directly between the plate and coils. In another embodiment, the gap between the plate 102 and the coils 100 is bridged by a solid to facilitate conduction with minimal friction. These and other strategies will be obvious to one reasonably skilled in the art.

A tube 101 held inside the solenoid can contain particles, either in plasma, gas, liquid or solid form, which spin along with the tube attached to the plate and thereby are driven through the magnetic field of the solenoid. The tube can be wrapped with a conducting coil to create a magnetic field inside the tube in order to hold the particles in place as an RF coil injects a resonant frequency to align the spins of the particles and optimize their collision with the opposing field of the solenoid.

The magnetic field of the solenoid is controlled by a timing mechanism which turns the current on and off at the appropriate moment to strike the fuel particles within the fuel tube as per the power demands of the system. The coils can be turned on and off individually so that the fuel in the tube can be struck repeatedly at different positions around the circumference. In one embodiment the solenoid is a single loop which turns on and off as per the power demands of the system.

The inner surface of the fuel tube is fabricated to collect the output of the destroyed particles, either photons or electrons. In one embodiment, the inner surface is a photoelectric semiconductor which converts photons to electricity, and in another embodiment the inner surface collects an output of electrons.

The energy output is conducted from the attached tube 101 back to the plate 102 across conductive wires 106 and out through a connector 107 towards utilization.

In one embodiment, the plate holding the fuel tube inside the solenoid contains channels 104, or a single channel, which lead from a spigot 105 at the center, or elsewhere on the plate, to the fuel tube 101, enabling the fuel tube to be replenished as needed. These channels can be connected by the spigot to a fuel cartridge that is either permanently or detachably connected to the system, or else the fuel tube can be refilled from a fuel source external to the system.

In various different embodiments, the solenoid and the plate that moves through it, will be configured in different shapes in order to achieve the same function of moving a fuel tube continuously through the magnetic field of a solenoid, as will be obvious to one reasonably skilled in the art.

The solenoid donut, integrated into a consumer product or other mechanism, can communicate with the mechanism so as to meet its power generation demands. Such a system involves a bidirectional communication link which communicates information from one or more solenoid donuts to the device, and control information from the device to one or more solenoid donuts.

In one embodiment, multiple solenoid donuts are attached in series to form stacks which can provide proportionally larger power outputs by combining the output of any number of individual solenoid donuts. Such stacks can be used to power a device or series of devices of any size in replacement of a battery or generator at any scale.

In one embodiment, multiple solenoid donuts are attached together by their spigots 105, which combine to form a piping system through which all of the fuel tubes can be refilled as needed.

The foregoing descriptions of embodiments have been presented for the purposes of illustration and description only. They are not intended to be exhaustive or to limit the present description to the forms disclosed. Accordingly, many modifications and variations will be apparent to practitioners skilled in the art. Additionally, the above disclosure is not limited to the present description.

What is claimed is:

1. A donut-shaped solenoid surrounding a plate which spins in a clockwise or counter-clockwise direction on a central pivot while holding a fuel tube within the solenoid without interrupting the current running through the solenoid, comprising:
   a solenoid attached end-to-end and shaped circumferentially around a central plate holding a tube filled with protium or other particles inside the coil;
   a central plate of conducting or semi-conducting material built into the coils of the solenoid, which spins at variable rates of speed and is also controlled to conduct electricity through all of the coils or some of the coils.

2. The device of claim 1, wherein the fuel tube containing particles in plasma, gas, liquid or solid form, is additionally wrapped in a conducting coil and an RF coil.

3. The device of claim 1, in which the interior of the tube held within the solenoid by the plate, is made of a semi-conducting photoelectric material designed to collect and convert an output of photons from inside the tube after particles have been destroyed.

4. The device of claim 1, in which the interior of the tube held within the solenoid by the plate, is made of conducting or semi-conducting material designed to collect an output of electrons from inside the tube after particles have been destroyed, and deliver them to power utilization, either through the plate or through one or more connectors attached directly to the tube or its supports.

5. The device of claim 1, in which the plate contains one or several channels designed to refill the tube through a spigot on the plate, from a fuel source that is either a cartridge permanently or detachably connected to the solenoid donut, or one external to the solenoid donut.

6. The device of claim 1, in which a computer program or other data signals, controls the timing of the solenoid coils, the current, the magnetic field and the movement of the plate and the coils in order to coordinate the device's function with the requirements of its utilization.

7. The device of claim 1, in which the small gap between the spinning plate and the coils it transects is bridged by a solid which allows the plate to spin with minimal friction while conducting electrons across the gap on either face of the plate.

8. The device of claim 1, in which a small gap between the spinning plate and the coils it transects is lubricated with a conducting fluid which allows the plate to spin with minimal friction while conducting electrons across the gap on either face of the plate, or which is non-conducting but permits direct contact with minimal friction between the plate and the coils.

9. The device of claim 1, in which a small gap between the spinning plate and the coils it transects is such that it allows the conduction of electrons across the gap unaided.

10. The device of claim 1, in which the solenoid has a semi-circular shape as the plate moves through it, or a linear shape as the plate moves through it.

* * * * *